(12) United States Patent
Perkins et al.

(10) Patent No.: US 8,319,635 B2
(45) Date of Patent: *Nov. 27, 2012

(54) WIRELESS TRACKING SYSTEM AND METHOD UTILIZING VARIABLE LOCATION ALGORITHMS

(75) Inventors: Matthew R. Perkins, San Diego, CA (US); Nicolas C. Nierenberg, La Jolla, CA (US)

(73) Assignee: Awarepoint Corporation, San Diego, CA (US)

( * ) Notice: Subject to any disclaimer, the term of this patent is extended or adjusted under 35 U.S.C. 154(b) by 800 days.

This patent is subject to a terminal disclaimer.

(21) Appl. No.: 12/484,233

(22) Filed: Jun. 14, 2009

(65) Prior Publication Data

US 2009/0251313 A1    Oct. 8, 2009

Related U.S. Application Data

(63) Continuation-in-part of application No. 12/114,740, filed on May 2, 2008, now Pat. No. 7,884,712.

(60) Provisional application No. 61/165,872, filed on Apr. 1, 2009, provisional application No. 60/916,737, filed on May 8, 2007.

(51) Int. Cl.
*G08B 1/08* (2006.01)
*G08B 13/14* (2006.01)

(52) U.S. Cl. ......... 340/539.13; 340/539.11; 340/539.12; 340/539.22; 340/572.1; 340/5.64

(58) Field of Classification Search .................. None
See application file for complete search history.

(56) References Cited

U.S. PATENT DOCUMENTS

| | | | |
|---|---|---|---|
| 6,697,417 B2 | 2/2004 | Fernandez-Corbaton et al. | |
| 6,701,615 B2 | 3/2004 | Harding et al. | |
| 7,082,286 B2 | 7/2006 | Kaewell, Jr. et al. | |
| 7,317,377 B2* | 1/2008 | Galperin et al. | 340/5.64 |
| 7,324,824 B2 | 1/2008 | Smith et al. | |
| 7,504,928 B2* | 3/2009 | Nierenberg et al. | 340/10.3 |
| 7,545,326 B2 | 6/2009 | Caliri et al. | |
| 7,733,224 B2 | 6/2010 | Tran | |
| 7,904,244 B2* | 3/2011 | Sugla | 701/300 |
| 2002/0102988 A1 | 8/2002 | Myllymaki | |
| 2003/0225893 A1 | 12/2003 | Roese et al. | |
| 2006/0055552 A1 | 3/2006 | Chung et al. | |
| 2006/0267833 A1 | 11/2006 | Langford et al. | |
| 2011/0128148 A1* | 6/2011 | Nierenberg et al. | 340/539.13 |
| 2012/0072238 A1* | 3/2012 | Collins et al. | 705/3 |
| 2012/0092130 A1* | 4/2012 | Chung et al. | 340/10.1 |

* cited by examiner

*Primary Examiner* — Julie Lieu
(74) *Attorney, Agent, or Firm* — Clause Eight IPS; Michael Catania (57) ABSTRACT

The present invention provides a solution to mistaken location calculations based on multipath effects. The present invention utilizes tags attached to objects that transmit signals at various power levels for reception by sensors stationed throughout a facility. Sensor readings at the various power levels are utilized to determine the location of the tagged object.

20 Claims, 10 Drawing Sheets

WIRELESS TRACKING SYSTEM AND METHOD UTILIZING VARIABLE LOCATION ALGORITHMS

CROSS REFERENCES TO RELATED APPLICATIONS

The Present application claims priority to U.S. Provisional Patent Application No. 61/165,872, filed on Apr. 1, 2009, and is a continuation-in-part application of U.S. patent application Ser. No. 12/114,740, filed on May 2, 2008, which claims priority to U.S. Provisional Application No. 60/916,737, filed on May 8, 2007, now abandoned.

STATEMENT REGARDING FEDERALLY SPONSORED RESEARCH OR DEVELOPMENT

Not Applicable

BACKGROUND OF THE INVENTION

1. Field of the Invention

The present invention is related to wireless tracking systems and methods. More specifically, the present invention relates to a system and method for mitigating multipath errors associated with the wireless tracking of objects by utilizing tags that transmit signals at various power levels.

2. Description of the Related Art

The ability to quickly determine the location of objects located within a facility is becoming a necessity of life. To the uninformed observer, the placement of transponders, also known as tags, on numerous non-stationary objects whether in an office or home would appear to be an unnecessary use of resources. However, the uninformed observer fails to appreciate the complexity of modern life and the desire for efficiency, whether at the office or home.

For example, in a typical hospital there are numerous shifts of employees utilizing the same equipment. When a new shift arrives, the ability to quickly locate medical equipment not only results in a more efficient use of resources, but also can result in averting a medical emergency. Thus, the tracking of medical equipment in a hospital is becoming a standard practice.

The tracking of objects in other facilities is rapidly becoming a means of achieving greater efficiency. A typical radio frequency identification system includes at least multiple tagged objects each of which transmits a signal, multiple receivers for receiving the transmissions from the tagged objects, and a processing means for analyzing the transmissions to determine the locations of the tagged objects within a predetermined environment. The tags can also receive signals.

Several prior art references discloses various tracking systems.

McKee et al., U.S. Pat. No. 6,915,135 discloses a system for determining presence, identity and duration of presence in a given area (a table in a restaurant) of an object (tag attached to a waiter).

Lester, U.S. Pat. No. 3,805,265 discloses a location system that uses line-of-sight radiant wave energy for signal transmission.

Schwengler U.S. Pat. No. 7,050,819, is directed at the problem of adequate power for a mobile telephone for a two-way communication function or a regeneration function as a node of a mesh network.

Christ, U.S. Pat. No. 5,977,913, discloses a radiofrequency system that is utilized within a prison and allows for an individual to be located after an alarm is triggered by the individual.

Zodnik, U.S. Patent Publication Number 2004/0147232, discloses wall-mounted (RJ-11 or RJ-45) wireless transceivers configured to only track the location of a self-identified wireless communication device in order to communicate the location of the self-identified wireless communication device to an emergency service such as 911.

One exemplary method triangulates the strongest received signals to determine the location of a tagged object. This method is based on the assumption that the receivers with the strongest received signals are the ones located closest to the tagged object. However, such an assumption is sometimes erroneous due to common environmental obstacles. Multipath effects can result in a further located receiver having a stronger received signal from a tagged object than a more proximate receiver to the tagged object, which can result in a mistaken location determination. The prior art has disclosed various means for overcoming multipath effects.

Tekinay, U.S. Pat. No. 6,259,894 for a Method For Improved Line-Of-Sight Signal Detection Using RF Model Parameters, discloses a method for reducing time-shift due to multipathing for a RF signal in an RF environment.

Close, U.S. Pat. No. 3,869,673 for a Method And Apparatus For Measuring Multipath Distortion, discloses a method for indicating multipath distortion in a received signal.

Lennen, U.S. Pat. No. 5,402,450 for a Signal Timing Synchronizer, discloses a method and apparatus for reducing the effects of multipath induced distortions on the accuracy of detecting the time of arrival of a received signal.

Fortune et al., U.S. Pat. No. 5,450,615 for a Prediction Of Indoor Electromagnetic Wave Propagation For Wireless Indoor Systems, discloses techniques for predicting RF propagation within a structure.

Other prior art references have disclosed the use of varying energy levels. For instance, Nakanishi, U.S. Pat. No. 5,451,847 for a Variable Energy Radio Frequency Quadrupole Linac discloses changing radio frequency energy levels to emitted focused and accelerated beams.

Kaewell, Jr. et al., U.S. Pat. No. 7,082,286 for a Path Searcher Using Reconfigurable Correlator Sets discloses producing a path profile for a user based on sorted output energy levels.

Fernabdez-Cobaton et al., U.S. Pat. No. 6,697,417 for a System And Method Of Estimating Earliest Arrival Of CDMA Forward And Reverse Link Signals discloses a mobile station receiver that detects the arrival times and energy levels of received signals, and constructs a searcher histogram and a finger histogram associated with each pilot signal.

The prior art has yet to resolve mistaken location calculations based on multipath effects for objects tracked within an indoor facility.

BRIEF SUMMARY OF THE INVENTION

The present invention provides a solution to mistaken location calculations based on multipath effects. The present invention utilizes communication devices attached to objects that transmit signals at various power levels for reception by sensors stationed throughout a facility.

One aspect of the present invention is a method for determining a real-time location of an object within a facility. The method includes transmitting a first wireless power level signal from a communication device associated with an object.

The method also includes transmitting a second wireless power level signal from the communication device associated with the object. In a preferred embodiment, the first and second power level signals are different. In an alternative embodiment, the first and second power level signals are the equal. The method also includes receiving the first wireless power level signal at at least one of a plurality of sensors positioned within an indoor facility and receiving the second wireless power level signal at at least one of a plurality of sensors positioned within a facility. The method also includes calculating a first power level location from the first wireless power level signal utilizing a first location algorithm. The method also includes calculating a second power level location from the second wireless power level signal utilizing a second location algorithm. The method also includes determining a real-time location of the object using the first power level location and the second power level location.

Preferably the first location algorithm is a radial basis function algorithm and the second location algorithm is a proximity detection algorithm. Preferably the first power level location and the second power level location are the same location. Preferably the first transmission power level is 1 milli-Watt and the second transmission power level is 0.5 milli-Watt. Preferably the indoor facility is a hospital. Alternatively, the indoor facility is an office, manufacturing plant and similar facilities. The wireless first power level signal is preferably one of light, radiofrequency, sound and magnetic energy. The second wireless power level signal is preferably one of light, radiofrequency, sound and magnetic energy. The first location algorithm and the second location algorithm are preferably a combination of at least two of an RBF algorithm, proximity detection, minimum mean square error calculation, maximum likelihood of calculation, time difference of arrival calculation, time of arrival calculation, spatial diversity algorithm, and angle of arrival calculation.

The method further includes associating the object with a second object. The method further includes triggering an event such as commencing a workflow event, transmitting an alert, transmitting a report, logging onto a computer, logging off of a computer, activating a camera, and activating a light.

Another aspect of the present invention is a system for determining a real-time location of an object within a facility. The system preferably includes mobile objects, sensors, and a central processor. Alternatively, the system comprises mobile objects, wireless transceivers such as infrared, ultrasound and radiofrequency transceivers, and processors such as computers, servers, microprocessors, mobile phones, personal digital assistants and similar processing devices. Each of the objects includes a communication device which transmits a first wireless power level signal and a second wireless power level signal. The sensors are positioned within the indoor facility, with at least one of the sensors receiving the first wireless power level signal and with at least one of the sensors receiving the second wireless power level signal. The server is in communication with each of the sensors. The server calculates a first power level location of the mobile object from the first wireless power level signal utilizing a first location algorithm, calculates a second power level location of the object from the second wireless power level signal utilizing a second location algorithm, and determines the location of the mobile object.

Another aspect of the present invention is a method for determining a real-time location of an object within a facility. The method includes receiving a first wireless power level signal at at least one of a plurality of sensors positioned within a facility. The method also includes receiving a second wireless power level signal at at least one of the plurality of sensors positioned within an indoor facility. The method also includes calculating a first power level location from the first wireless power level signal utilizing a first location algorithm. The method also includes calculating a second power level location from the second wireless power level signal utilizing a second location algorithm. The method also includes determining a real-time location of an object using the first power level location and the second power level location.

Having briefly described the present invention, the above and further objects, features and advantages thereof will be recognized by those skilled in the pertinent art from the following detailed description of the invention when taken in conjunction with the accompanying drawings.

DETAILED DESCRIPTION OF THE INVENTION

As shown in FIGS. 1-4, a system for tracking objects within a facility is generally designated 50. The system 50 is capable of determining real-time location of an object 100 within a facility 70. The system 50 preferably includes a plurality of sensors 55, a plurality of bridges 56, a plurality of communication devices 60 and at least one central processor 65. One example of the components of the system 50 is disclosed in U.S. Pat. No. 7,197,326, for a Wireless Position Location And Tracking System, which is hereby incorporated by reference in its entirety. A more specific example of the sensors 55 is disclosed in U.S. Pat. No. 7,324,824, for a Plug-In Network Appliance, which is hereby incorporated by reference in its entirety.

The system 50 is preferably employed at a facility 70 such as a business office, factory, home, hospital and/or government agency building. The system 50 is utilized to track and locate various objects positioned throughout the facility 70. The communication devices 60 preferably continuously transmit signals on a predetermined time cycle, and these signals are received by sensors 55 positioned throughout the facility 70. Alternatively, the tags 60 transmit signals in a random, ad-hoc or dynamic manner, and these signals are received by the sensors 55 positioned throughout the facility 70. As discussed below, in order to mitigate multipath effects, the communication devices 60 transmit signals at various power levels. The sensors 55 transmit the data from the communication devices 60 to a bridge 56 for transmission to a server 65. If a sensor 55 is unable to transmit to a bridge 56, the sensor 55 may transmit to another sensor 55 in a mesh network-like system for eventual transmission to a bridge 56. In a preferred embodiment, a transmission is sent from a transmission distance of six sensors 55 from a bridge 56. Alternatively, a transmission is sent from a transmission distance ranging from ten to twenty sensors 55 from a bridge 56. The central processor 65 preferably continuously receives transmissions from the sensors 55 via the bridges 56 concerning the movement of objects 100 bearing a communication device 60 within the facility 70. The central processor 65 processes the transmissions from the sensors 55 and calculates a real-time position for each of the objects 100 bearing a communication device 60 within the facility 70. The real-time location information for each of the objects 100 bearing a communication devices 60 is preferably displayed on an image of a floor plan of the facility 70, or if the facility 70 has multiple floors, then on the floor plan images of the floors of the facility 70. The floor plan image may be used with a graphical user interface of a computer, personal digital assistant, or the like so that an individual of the facility 70 is able to quickly locate objects 100 within the facility 70.

Figure 1:
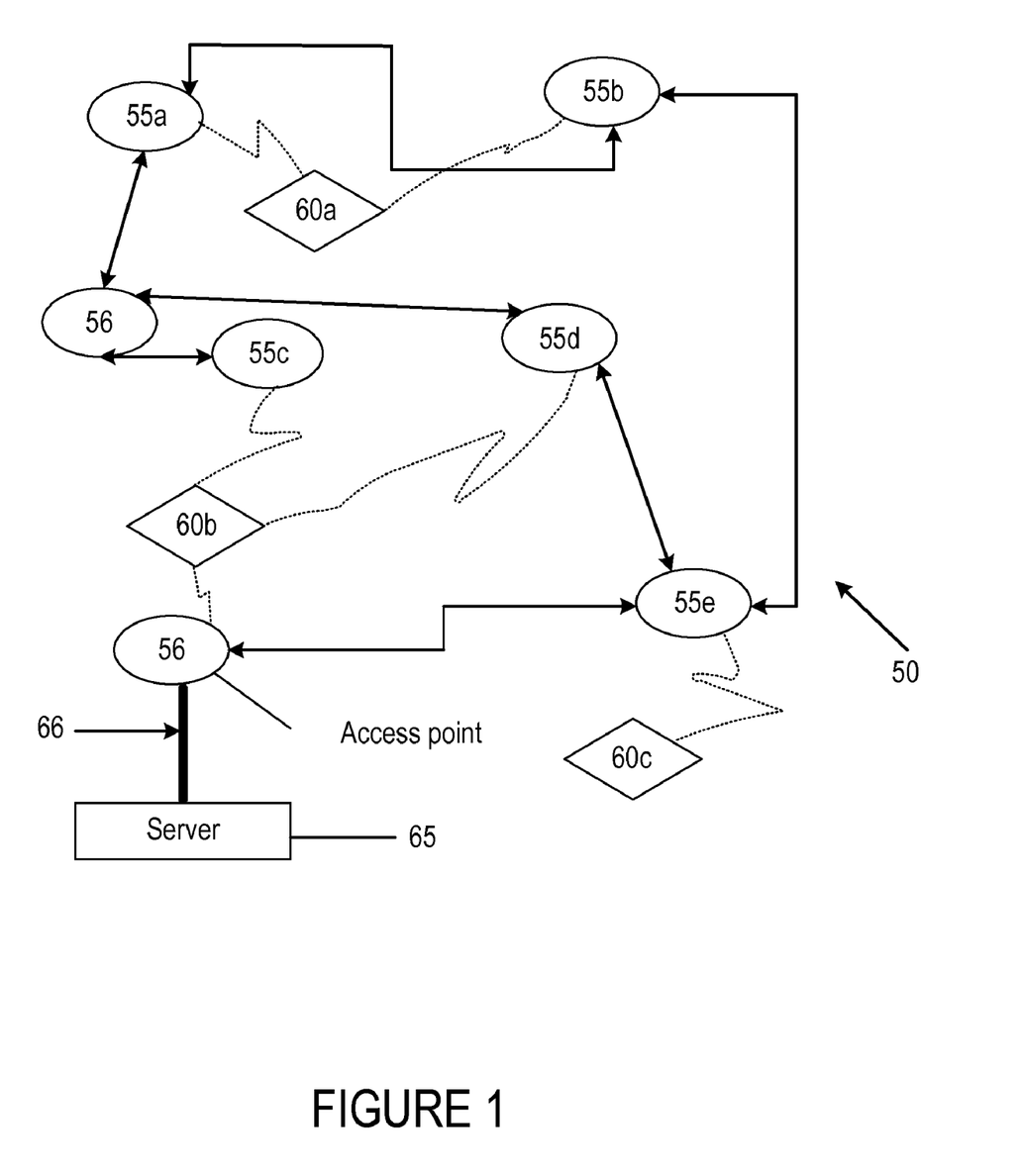
FIG. 1 is schematic view of a system for determining a real-time location of an object within a facility.

As shown in FIG. 1, the system 50 utilizes sensors 55 to monitor and identify the real-time position of non-stationary objects bearing or integrated with communication devices 60. The sensors 55a-f preferably wirelessly communicate with each other (shown as double arrow lines) and with a central processor 65 through a wired connection 66 via at least one bridge 56, such as disclosed in the above-mentioned U.S. Pat. No. 7,324,824 for a Plug-In Network Appliance. The communication devices 60a-c transmit signals at various power levels (shown as dashed lines) which are received by the sensors 55a-e, which then transmit signals to bridges 56 for eventual transmission to a central processor 65. The central processor 65 is preferably located on-site at the facility 70. However, the system 50 may also include an off-site central processor 65, not shown.

In a preferred embodiment, each communication device 60 preferably transmits a radio frequency signal of approximately 2.48 GigaHertz ("GHz"). The communication format is preferably IEEE Standard 802.15.4. Alternatively, each communication device 60 transmits an infrared signal or an ultrasound signal. Each communication device 60 preferably transmits at a plurality of transmission power levels, preferably ranging from two to twenty different transmission power levels (energy levels), more preferably from two to ten different transmission power levels, and most preferably two different transmission power levels. Alternatively, the transmission power levels are the same. The number of communication device transmission power levels varies depending on data transmission constraints and time constraints for the system. In one preferred embodiment, the first power level is approximately 1 milli-Watt and the second power level is approximately 0.5 milli-Watt. In a preferred embodiment, the communication device 60 transmits each signal at a different power level before transmitting again at the original power level. Alternatively, the communication device 60 transmits at a sequence of power levels that can be predicted by the sensors 55, bridges 56 and/or central processor 65. For example, the communication device 60 transmits a first signal at a first power level and the next signal at a second power level. Those skilled in the pertinent art will recognize that the communication devices 60 may operate at various frequencies and mediums (infrared, ultrasound and others) without departing from the scope and spirit of the present invention.

Figure 2:
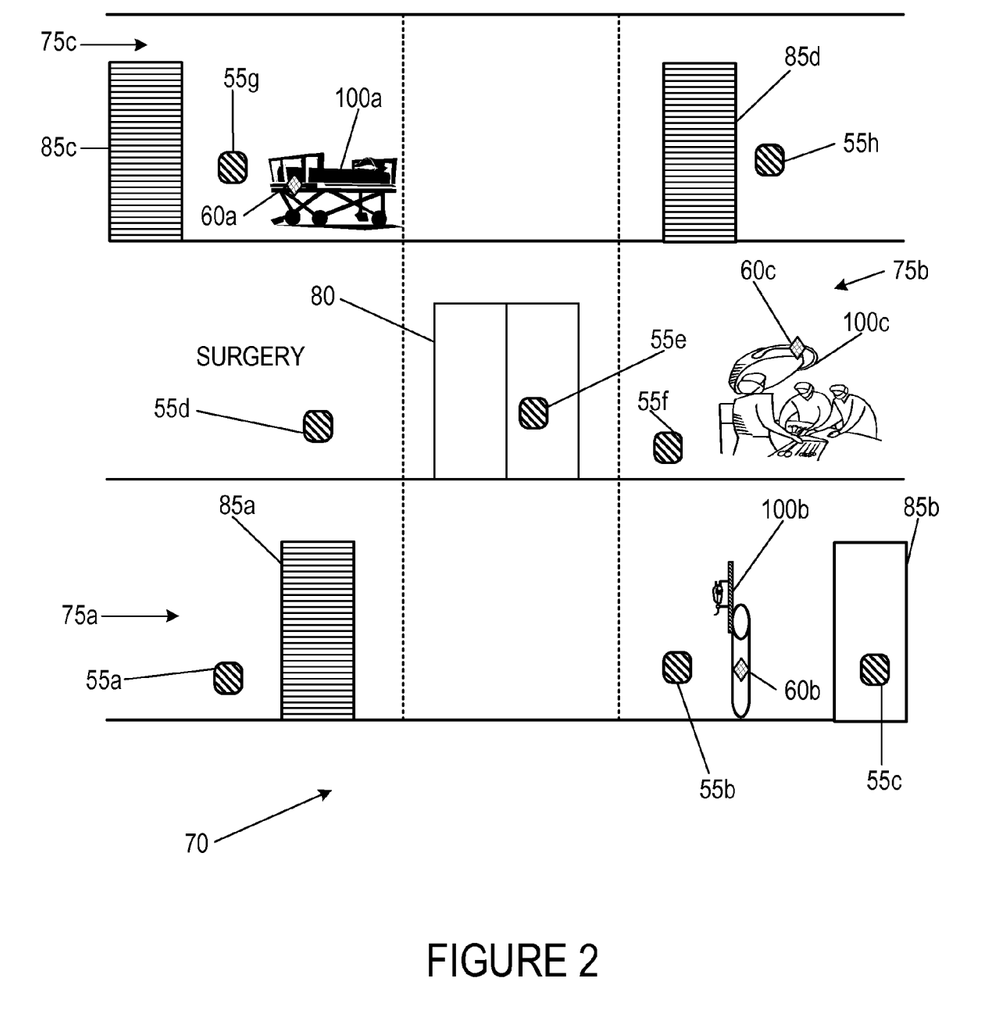
FIG. 2 is a multi-floor view of a facility employing a system for determining a real-time location of an object within a facility.
Figure 3:
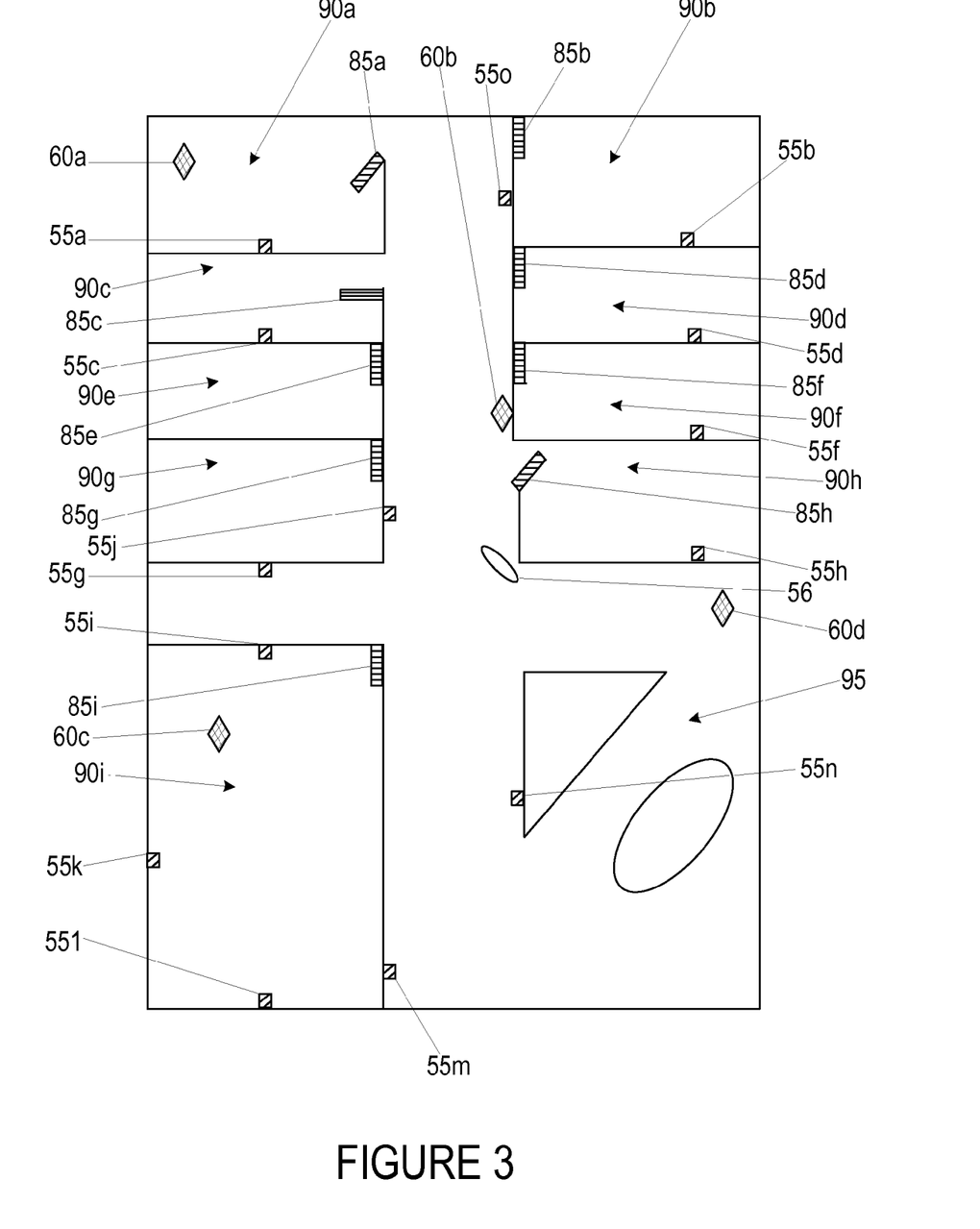
FIG. 3 is a floor plan view of a single floor in a facility employing the system for determining a real-time location of an object within a facility.
Figure 4:
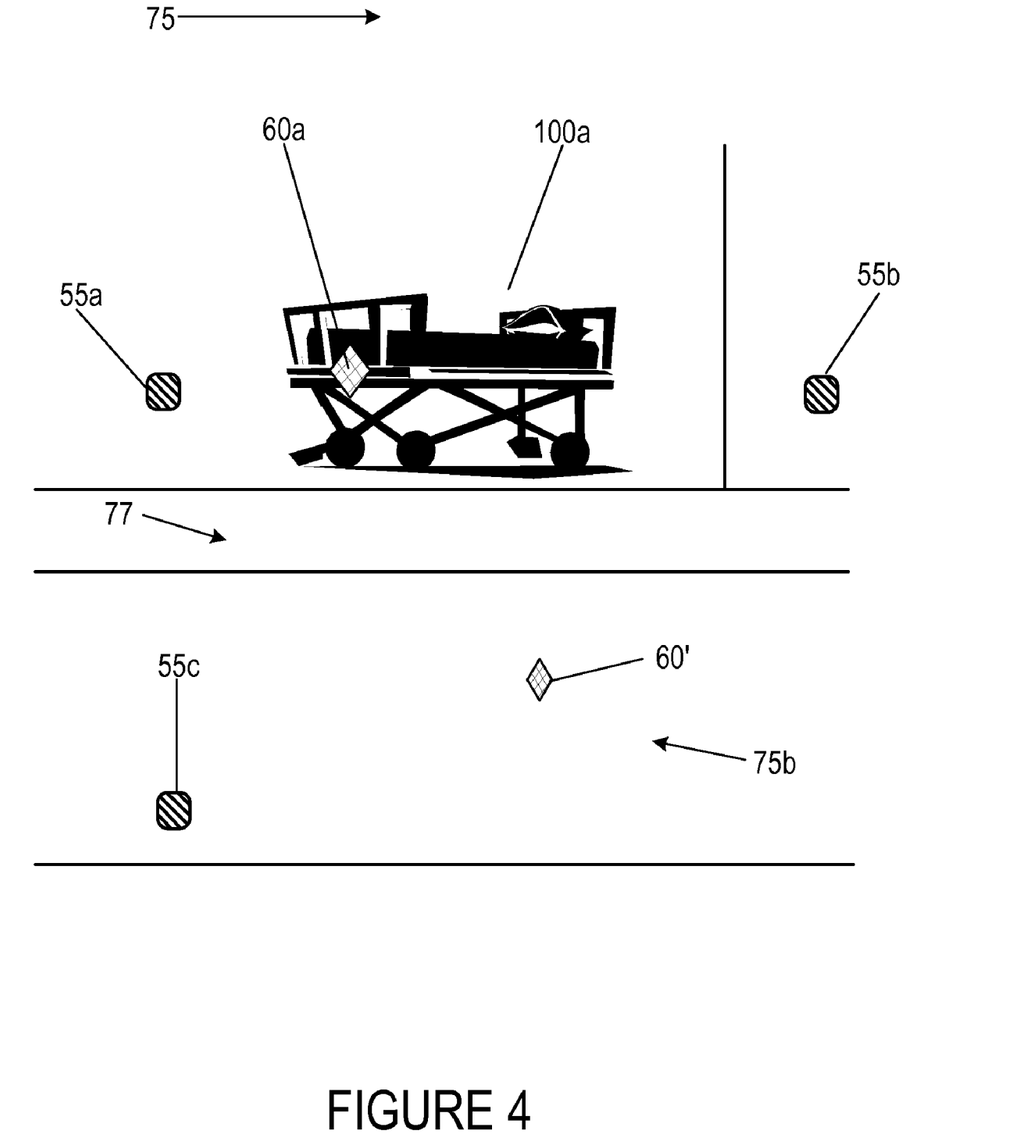
FIG. 4 is a two-floor view of a facility including a tagged object and sensors of a system for determining a real-time location of an object within a facility.

As shown in FIGS. 2-4, the facility 70 is depicted as a hospital. The facility 70 has a multitude of floors 75a-c. An elevator 80 provides access between the various floors 75a, 75b and 75c. Each floor 75a, 75b and 75c has a multitude of rooms 90a-i, with each room 90 accessible through a door 85. Positioned throughout the facility 70 are sensors 55a-o for obtaining readings from communication devices 60a-d attached to or integrated into non-stationary objects 100a, 100b (see FIGS. 2 and 4). A bridge 56 is also shown for receiving transmissions from the sensors 55 for processing by the central processor 65.

As shown in FIG. 4, the communication device 60a is attached to movable bed 100a positioned on an upper floor 75c. The communication device 60a transmits a signal which is received by sensors 55a, 55b and 55c. If the signal to sensor 55c is the strongest, then an analysis of the readings from the sensors 55a-c may place the communication device 60a, and thus the movable bed 100a, at position 60' on the lower floor 75b. This type of faulty reading would likely occur with triangulation. To prevent such a faulty positioning reading, the present invention processes the readings preferably according to a method which eliminates the reading from sensor 55c from the location calculation for movable bed 100a.

Figure 5:
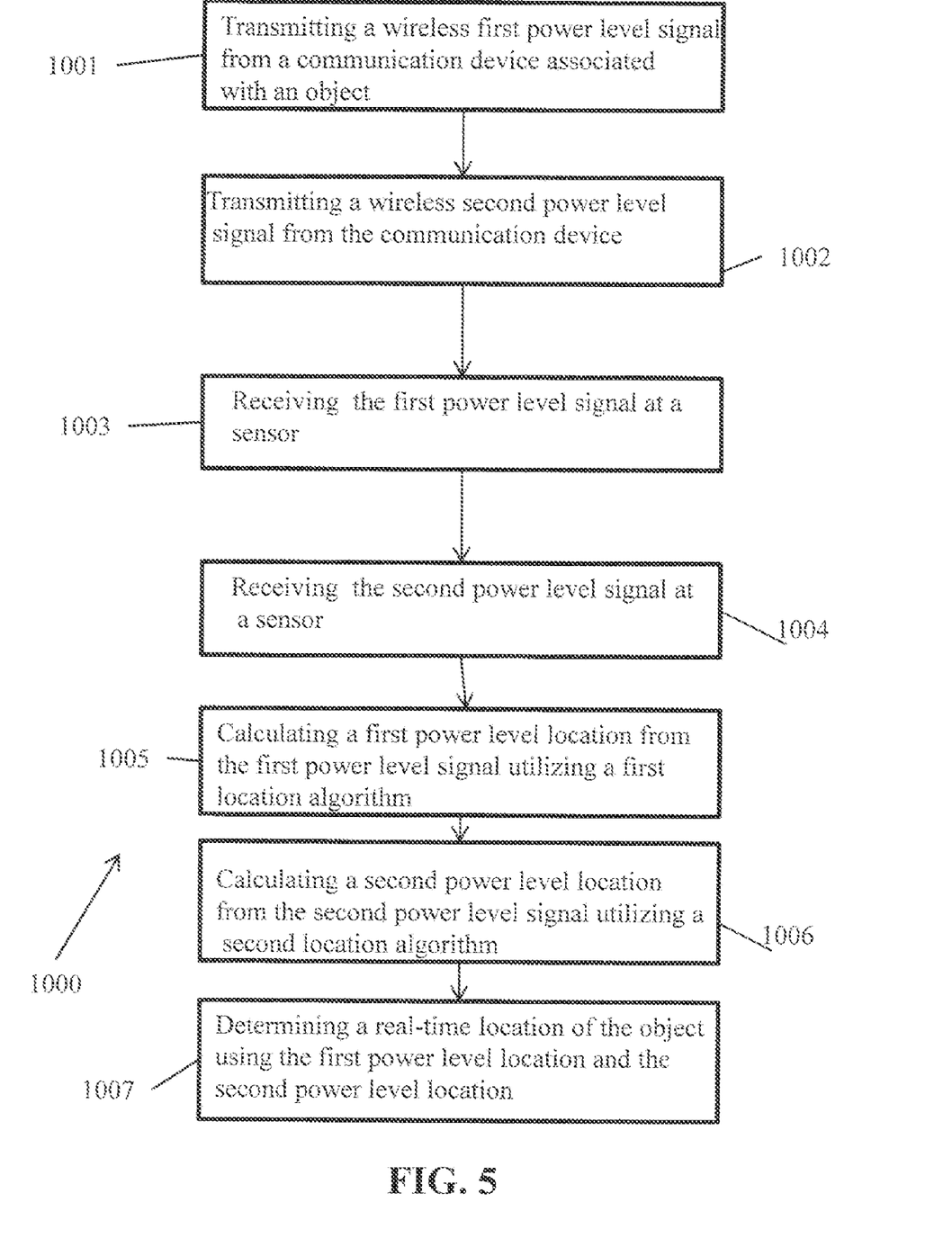
FIG. 5 is a flow chart of a method determining a real-time location of an object within a facility.

A method 1000 for determining a real-time location of an object within a facility is illustrated in FIG. 5. At block 1001, a first wireless power level signal is transmitted from a communication device associated with an object. At block 1002, a second wireless power level signal is transmitted from the communication device associated with the object. At block 1003, the first wireless power level signal is received at at least one of a plurality of sensors positioned within a facility. At block 1004, the second wireless power level signal is received at at least one of a plurality of sensors positioned within the facility. The same sensor may receive both the first and second wireless power level signals. At block 1005, a first power level location is calculated from the first wireless power level signal utilizing a first location algorithm. At block 1006, a second power level location is calculated from the second wireless power level signal utilizing a second location algorithm. Preferably the first location algorithm is a radial basis function algorithm and the second location algorithm is a proximity detection algorithm. At block 1007, a real-time location of the object is determined using the first power level location and the second power level location.

Figure 6:
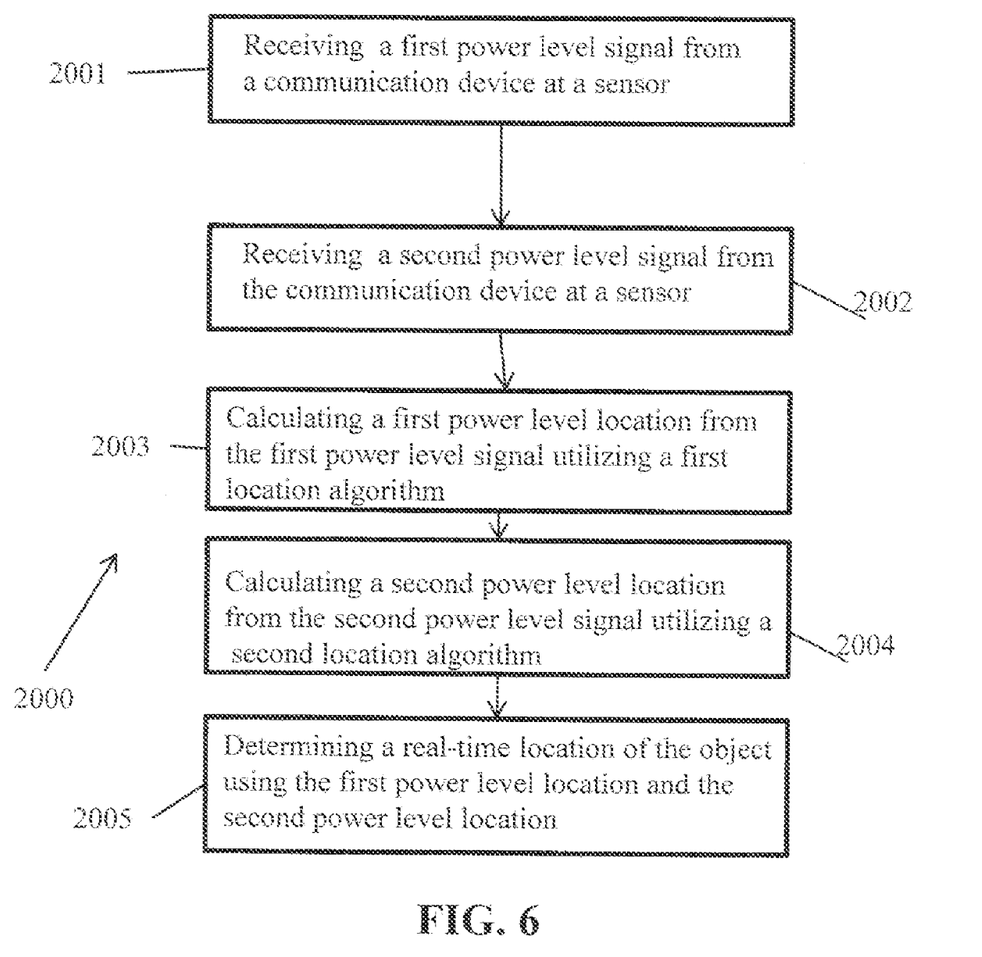
FIG. 6 is a flow chart of a method determining a real-time location of an object within a facility.

Another method 2000 for determining a real-time location of an object within a facility is illustrated in FIG. 6. At block 2001, a first wireless power level signal from a communication device is received at at least one of a plurality of sensors positioned within a facility. At block 2002, a second wireless power level signal from the communication device is received at at least one of a plurality of sensors positioned within the facility. The same sensor may receive both the first and second wireless power level signals. At block 2003, a first power level location is calculated from the first wireless power level signal utilizing a first location algorithm. At block 2004, a second power level location is calculated from the second wireless power level signal utilizing a second location algorithm. Preferably the first location algorithm is a radial basis function algorithm and the second location algorithm is a proximity detection algorithm. At block 2005, a real-time location of the object is determined using the first power level location and the second power level location.

Figure 7:
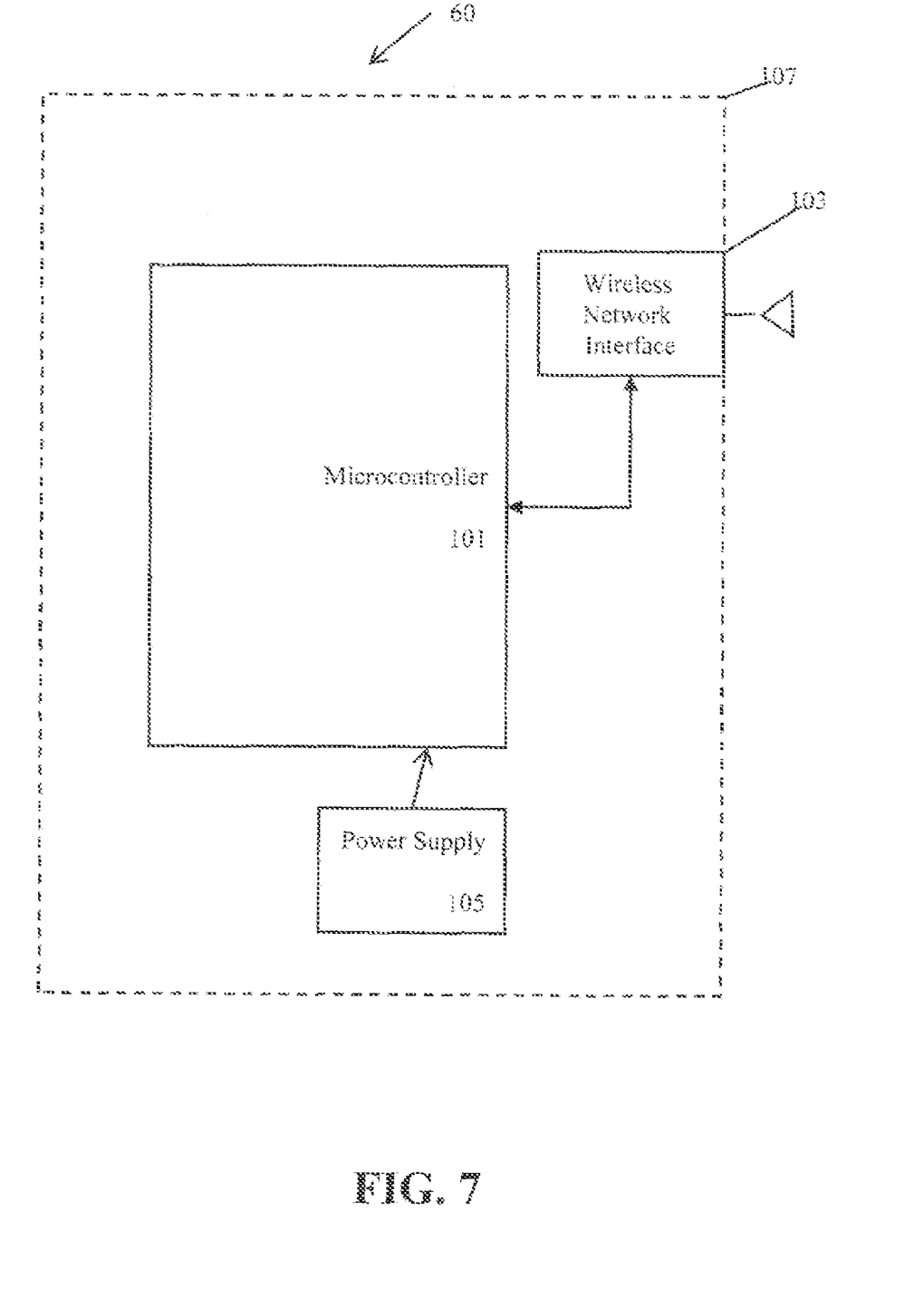
FIG. 7 is a block diagram of a communication device employing variable radiofrequency power level transmissions.

A communication device 60 that utilizes different power levels of radiofrequency signals is illustrated in FIG. 7. A microcontroller 101 has a software programmable transmit power for modification from transmission to transmission. The transmissions are transmitted through transceiver 103. A power supply 105 provides power to the device 60. All of the components are preferably contained within a housing 170.

Figure 8:
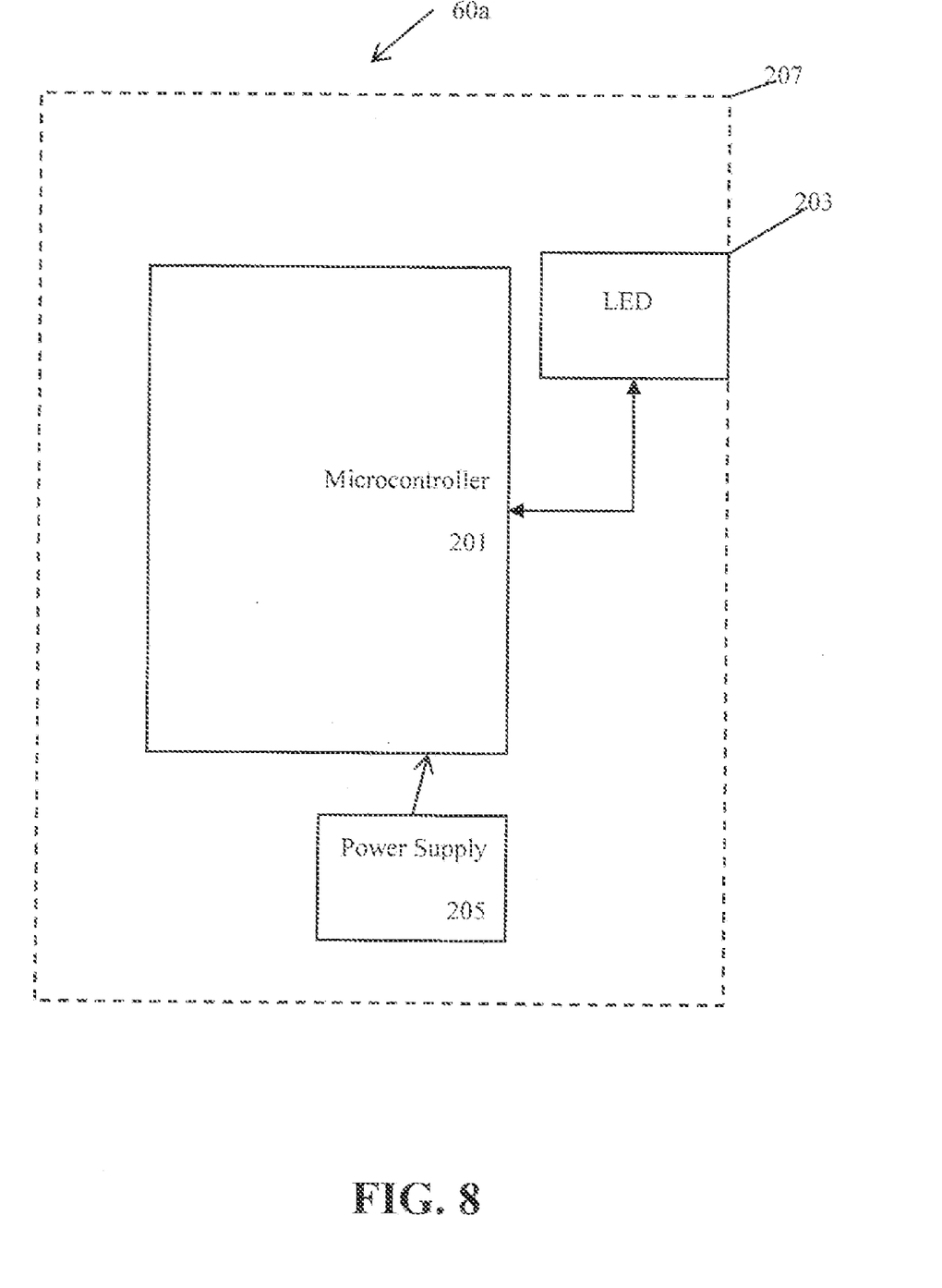
FIG. 8 is a block diagram of a communication device employing variable light intensity level transmissions.

A communication device 60a that utilizes different power levels of light is illustrated in FIG. 8. A microcontroller 201 has a software programmable transmit power for modification from transmission to transmission. The transmissions are transmitted through LED 203, preferably an infrared transceiver. A power supply 205 provides power to the device 60a. All of the components are preferably contained within a housing 207.

Figure 9:
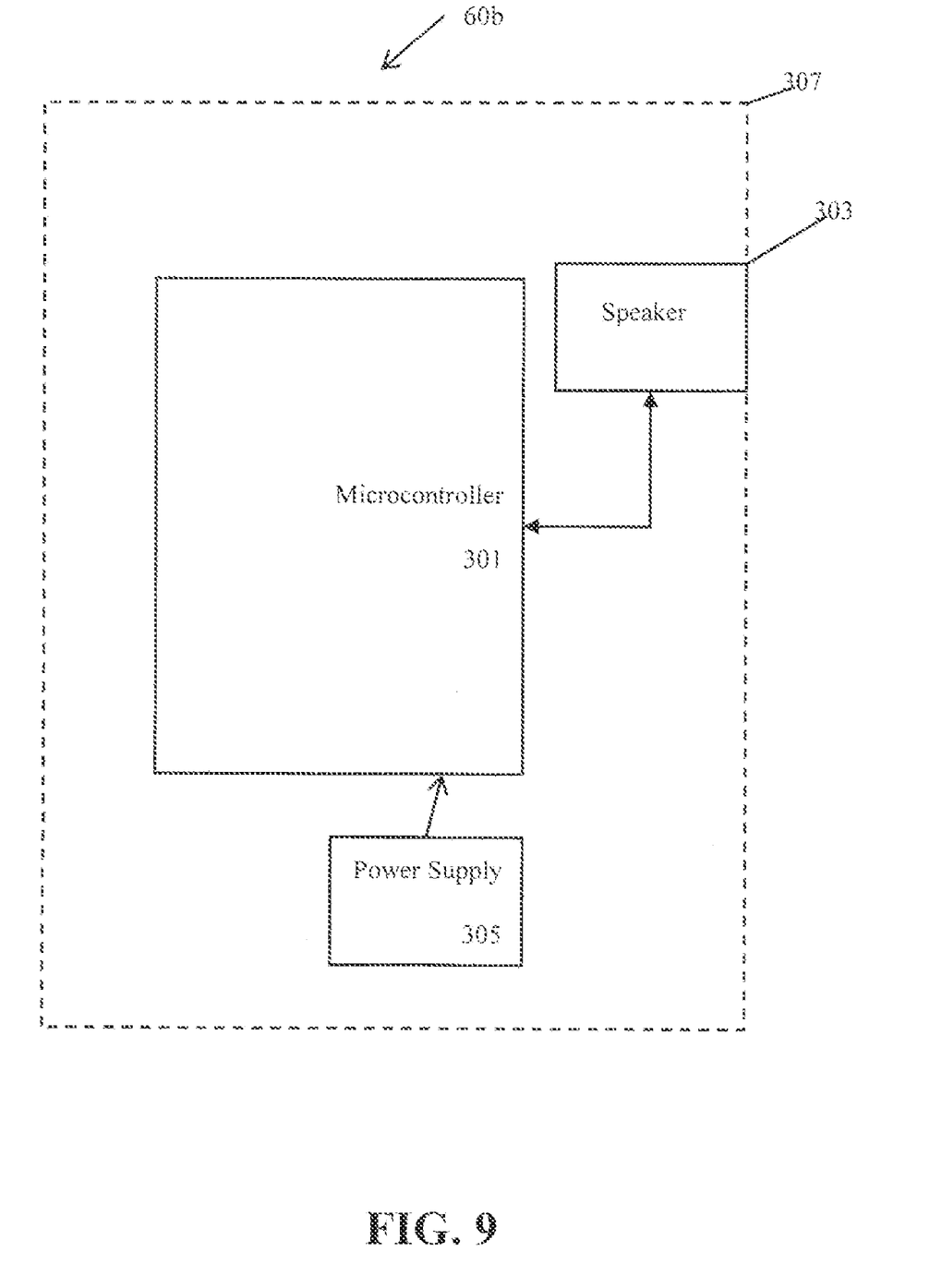
FIG. 9 is a block diagram of a communication device employing variable sound level transmissions.

A communication device 60b that utilizes different power levels of sound is illustrated in FIG. 9. A microcontroller 301 has a software programmable transmit power for modification from transmission to transmission. The transmissions are transmitted through a speaker device 303, preferably an ultrasound transducer. A power supply 305 provides power to the device 60b. All of the components are preferably contained within a housing 307.

Figure 10:
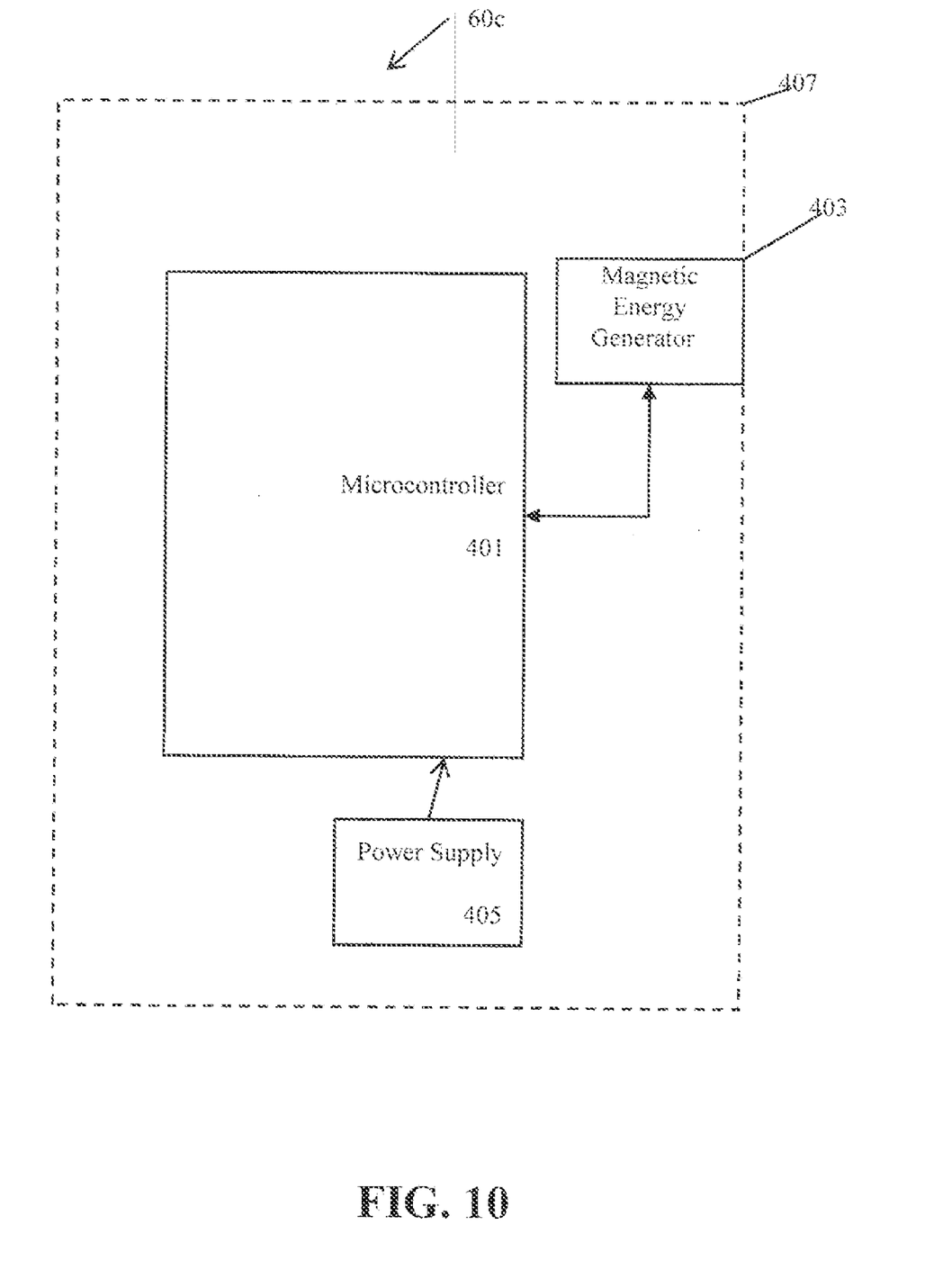
FIG. 10 is a block diagram of a communication device employing variable magnetic energy level transmissions.

A communication device 60c that utilizes different power levels of magnetic energy is illustrated in FIG. 10. A microcontroller 401 has a software programmable transmit power for modification from transmission to transmission. The transmissions are transmitted through a magnetic energy generator 403, preferably an electromagnetic transceiver. A power supply 405 provides power to the device 60c. All of the components are preferably contained within a housing 407.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes modification and substitutions of equivalents may be made therein without departing from the spirit and scope of this invention which is intended to be unlimited by the foregoing except as may appear in the following appended claim. Therefore, the embodiments of the invention in which an exclusive property or privilege is claimed are defined in the following appended claims.

We claim as our invention:

1. A method for determining a real-time location of an object within a facility, the method comprising:
   transmitting a wireless first power level signal from a communication device associated with an object;
   transmitting a wireless second power level signal from the communication device associated with the object;
   receiving the first power level signal at at least one of a plurality of sensors positioned within a facility and receiving the second power level signal at at least one of a plurality of sensors positioned within a facility;
   calculating a first power level location from the first power level signal utilizing a first location algorithm;
   calculating a second power level location from the second power level signal utilizing a second location algorithm; and
   determining a real-time location of the object using the first power level location and the second power level location.

2. The method according to claim 1 wherein first location algorithm is a radial basis function algorithm and the second location algorithm is a proximity detection algorithm.

3. The method according to claim 1 wherein first location algorithm is a radial basis function algorithm and the second location algorithm is a spatial diversity algorithm.

4. The method according to claim 1 wherein the first power level location and the second power level location are the same location.

5. The method according to claim 1 wherein the first power level is 1 milli-Watt and the second power level is 0.5 milli-Watt.

6. The method according to claim 1 wherein the first power level is equal to the second power level.

7. The method according to claim 1 wherein the wireless first power level signal is one of light, radiofrequency, sound and magnetic energy.

8. The method according to claim 7 wherein the wireless second power level signal is one of light, radiofrequency, sound and magnetic energy.

9. The method according to claim 1 wherein the first location algorithm and the second location algorithm are a combination of at least two of an RBF algorithm, proximity detection, minimum mean square error calculation, maximum likelihood of calculation, time difference of arrival calculation, time of arrival calculation, and angle of arrival calculation.

10. The method according to claim 1 further comprising associating the transmitting object with a second object.

11. The method according to claim 1 further comprising triggering an event.

12. The method according to claim 11 wherein the event is at least one of commencing a workflow event, changing the status of a workflow process, transmitting an alert, transmitting a report, changing the status of a computer, activating a camera, and changing the state of light.

13. A system for determining a real-time location of an object within a facility, the system comprising:
   a plurality of objects, each of the plurality of objects comprising a communication device which transmits a wireless first power level signal and a wireless second power level signal;
   a plurality of sensors positioned within the facility, at least one of the plurality of sensors receiving the first power level signal and at least one of the plurality of sensors receiving the second power level signal;
   a server in communication with each of the plurality of sensors, the server calculating a first power level location of the object from the first power level signal utilizing a first location algorithm, calculating a second power level location of the object from the second power level signal utilizing a second location algorithm, and determining a real-time location of the object using the first power level location and the second power level location.

14. The system according to claim 13 wherein first location algorithm is a radial basis function algorithm and the second location algorithm is a proximity detection algorithm.

15. The system according to claim 13 wherein at least one of the plurality of objects is a medical device or a person.

16. A method for determining a real-time location of an object within a facility, the method comprising:
   receiving a first wireless power level signal from a communication device of an object at at least one of a plurality of sensors positioned within a facility;
   receiving a second wireless power level signal the communication device of the object at at least one of the plurality of sensors positioned within the facility;
   calculating a first power level location from the first wireless power level signal utilizing a first location algorithm;

calculating a second power level location from the second wireless power level signal utilizing a second location algorithm; and determining a real-time location of the object using the first power level location and the second power level location.

17. The method according to claim 16 wherein first location algorithm is a radial basis function algorithm and the second location algorithm is a proximity detection algorithm.

18. The method according to claim 16 wherein the first wireless power level signal is one of light, radiofrequency, sound and magnetic energy.

19. The method according to claim 16 wherein the second wireless power level signal is one of light, radiofrequency, sound and magnetic energy.

20. The method according to claim 16 wherein the first location algorithm and the second location algorithm are a combination of at least two of an RBF algorithm, proximity detection, minimum mean square error calculation, maximum likelihood of calculation, time difference of arrival calculation, time of arrival calculation, and angle of arrival calculation.

* * * * *